US010920907B2

(12) United States Patent
Suga et al.

(10) Patent No.: US 10,920,907 B2
(45) Date of Patent: Feb. 16, 2021

(54) VALVE DIAGNOSIS METHOD AND VALVE DIAGNOSIS DEVICE

(71) Applicants: TOMOE VALVE CO., LTD., Osaka (JP); THE RITSUMEIKAN TRUST, Kyoto (JP)

(72) Inventors: Masato Suga, Takarazuka (JP); Manabu Miyamoto, Hirakata (JP); Yasutoshi Nomura, Nagaokakyo (JP)

(73) Assignees: TOMOE VALVE CO., LTD., Osaka (JP); THE RITSUMEIKAN TRUST, Kyoto (JP)

( * ) Notice: Subject to any disclaimer, the term of this patent is extended or adjusted under 35 U.S.C. 154(b) by 282 days.

(21) Appl. No.: 16/088,648

(22) PCT Filed: Mar. 16, 2017

(86) PCT No.: PCT/JP2017/010675
§ 371 (c)(1),
(2) Date: Sep. 26, 2018

(87) PCT Pub. No.: WO2017/169849
PCT Pub. Date: Oct. 5, 2017

(65) Prior Publication Data
US 2019/0107463 A1    Apr. 11, 2019

(30) Foreign Application Priority Data
Mar. 29, 2016  (JP) .................. 2016-066522

(51) Int. Cl.
*F16K 37/00*  (2006.01)
*G01M 13/00*  (2019.01)
*G01M 13/003* (2019.01)

(52) U.S. Cl.
CPC ............. *F16K 37/00* (2013.01); *G01M 13/00* (2013.01); *G01M 13/003* (2019.01)

(58) Field of Classification Search
None
See application file for complete search history.

(56) References Cited

U.S. PATENT DOCUMENTS 8,744,813 B2 * 6/2014 Lacaille ............... G05B 23/024
703/2
8,855,898 B2   10/2014 Maier et al.
(Continued)

FOREIGN PATENT DOCUMENTS

CN   101566523 A   10/2009
CN   102207426 A   10/2011
(Continued)

OTHER PUBLICATIONS

Bacci di Capaci et al. A Performance Monitoring Tool to Quantify Valve Stiction in Control Loops, Aug. 2014 19th World Congress the International Federation of Automatic Control, Cape Town, South Africa, (Year: 2014).*
(Continued)

*Primary Examiner* — Roy Y Yi
(74) *Attorney, Agent, or Firm* — Renner, Otto, Boisselle & Sklar, LLP

(57) ABSTRACT

A diagnosis method is provided for appropriately predicting a state change of a valve with a simple configuration. The valve diagnosis method comprises: calculating a value of a first rate of change, with respect to a predetermined damage index during reference data acquisition, of the predetermined damage index during diagnosis; calculating a value of a second rate of change, with respect to a root mean square value calculated from a difference between predicted waveform data of vibration during reference data acquisition and vibration data serving as reference, of a root mean square value calculated from a difference between predicted waveform data of vibration during diagnosis and vibration data during diagnosis; in a plane, arranging a plot of a diagnostic
(Continued)

result based on a value of the first rate of change being calculated and a value of the second rate of change being calculated; and determining a state of a valve to be diagnosed based on a value of the first rate of change being calculated, a value of the second rate of change being calculated, and an arrangement position on the plane of a plot of the diagnostic result.

6 Claims, 9 Drawing Sheets

(56) References Cited

U.S. PATENT DOCUMENTS

| | | |
|---|---|---|
| 2002/0095986 A1 | 7/2002 | Ito |
| 2015/0362090 A1 | 12/2015 | Anderson |

FOREIGN PATENT DOCUMENTS

| | | |
|---|---|---|
| CN | 102721519 A | 10/2012 |
| CN | 102759434 A | 10/2012 |
| CN | 102831325 A | 12/2012 |
| CN | 102944435 A | 2/2013 |
| EP | 2699778 B1 | 4/2015 |
| GB | 2518893 A | 4/2015 |
| JP | 60-171507 A | 9/1985 |
| JP | 61-28968 U | 2/1986 |
| JP | 06-300667 A | 10/1994 |
| JP | 2002-130531 A | 5/2002 |
| JP | 2010-54434 A | 3/2010 |
| JP | 2011-27615 A | 2/2011 |
| SU | 1132175 A | 12/1983 |
| WO | 2012143630 A1 | 10/2012 |
| WO | 2015/146295 A1 | 10/2015 |

OTHER PUBLICATIONS

Patri et al. (Predicting Compressor Valve Failures from Multi-Sensor Data, Society of Petroleum Engineers, Apr. 2015) SPE-174044-MS, (Year: 2015).*
International Search Report for corresponding App. No. PCT/JP2017/010675, dated May 16, 2017.
Search Report for Chinese Application No. 201780019670X dated Nov. 21, 2019.
International Preliminary Report on Patentability (IPRP) for corresponding App. No. PCT/JP2017/010675, dated Oct. 11, 2018.

* cited by examiner

VALVE DIAGNOSIS METHOD AND VALVE DIAGNOSIS DEVICE

TECHNICAL FIELD

The present invention relates to a valve diagnosis method and a valve diagnosis device for predicting in advance a malfunction due to valve stem sticking of a valve or the like.

BACKGROUND

A wide variety of valves are used in various plants and factories. The maintenance of these valves includes following three methods.
(1) Maintenance method of replacement after valve failure.
(2) Maintenance method of performing regular maintenance according to usage period.
(3) Method of taking necessary measures before failure occurrence according to the state of the valve.

The maintenance method (1) has a problem that upon failure occurrence at an unexpected timing, the whole device incorporating a valve has to be stopped for a predetermined period of time for valve replacement. In addition, the maintenance method (2) has a problem that unnecessary costs may occur because parts constituting the valve have to be regularly replaced even if the parts are in good and still usable condition. However, even when regular replacement is performed, if a sudden failure occurs, the whole device has to be stopped for a predetermined period of time for valve replacement similarly to the maintenance method (1).

The method (3) does not have a problem that the whole device has to be stopped for a predetermined period of time for valve replacement, or a problem that regularly replacing the valve and the parts thereof even if the valve and the parts thereof are in good and still usable condition may lead to costs negligence. Several methods for predicting the state change of the valve have been proposed hitherto in order for the maintenance method (3) to be performed.

Japanese Patent Application Laid-Open No. 6-300667 discloses a method for detecting a crack or the like of the valve stem. In this method, an acceleration sensor is attached to the valve stem, and vibration generated in the valve stem due to on-site percussion by a person is measured. The natural frequency is calculated from the measured data, and damage of the valve stem is diagnosed by comparing the natural frequency during soundness with the natural frequency during measurement. This method includes following problems.
[1] When the valve stem is exposed to high temperature or when the valve stem is inside the valve and is not exposed to the outside, it may be difficult to attach an acceleration sensor to the valve stem.
[2] A person needs to go to the site to percuss the valve stem.
[3] The vibration measured by the percussion may change depending on the position to be hit by the percussion hammer, the angle to be hit, and the like.
[4] If the time interval between two pieces of percussion is too long, cracks and the like cannot be detected before damage occurs.
[5] The valve stem cannot be monitored all the time.

Japanese Patent Application Laid-Open No. 2002-130531 discloses a method of attaching a driving force sensor, a supply energy sensor to a drive unit, and a vibration sensor to the drive unit of a valve device and predicting deterioration with data from the sensors. This method includes following problems.

[1] Since the permanent driving force sensor needs to be attached to the drive unit, the drive unit is expensive.
[2] Since diagnosis is performed using data of intermediate torque, the valve cannot be diagnosed without moving the valve.
[3] Since the validity of the allowable value to be set for each specification of the valve varies depending on the use condition, it is difficult to set an appropriate allowable value without accumulation of actual use results.

Japanese Patent Application Laid-Open No. 2011-27615 discloses a method of measuring the fluid pressure upstream and downstream of a valve and indirectly evaluating the vibration of the valve from the fluid pressure to monitor the valve soundness. This method includes following problems.
[1] It is necessary to prepare an appropriate structural analysis model in advance.
[2] The vibration is only estimated indirectly from fluid pressure, and is not necessarily accurately evaluated.

Japanese Patent Application Laid-Open No. 2010-54434 discloses a method of diagnosing abnormality of a valve by transmitting an ultrasonic wave to a valve and receiving the ultrasonic wave reflected from the valve. This method includes a following problem.
[1] An ultrasonic device is separately required to excite elastic waves in the valve.

Japanese Unexamined Utility Model Application Publication No. 561-28968 discloses a method of measuring the sound generated in a valve by leakage by using an ultrasonic acoustic detector and measuring the leakage amount. This method includes a following problem.
[1] It is necessary to build an analytical model of valves in a piping state in advance.

SUMMARY

The present invention provides a diagnosis method and a diagnosis device for appropriately predicting a state change of a valve with a simple configuration. The diagnosis method and the diagnosis device for appropriately predicting a state change of a valve has an object, for example, to enable a manager or an operator of the valve to appropriately select and determine necessary measures to be performed before occurrence of failure according to the state of the valve.

Means for Solving Problem

The valve diagnosis method according to the present invention includes the steps of:
calculating a value of a first rate of change, with respect to a predetermined damage index during reference data acquisition calculated based on an autoregressive model constructed based on vibration data serving as reference, of the predetermined damage index during diagnosis calculated based on an autoregressive model constructed based on vibration data during diagnosis;
calculating a value of a second rate of change, with respect to a root mean square value calculated from a difference between predicted waveform data of vibration based on an autoregressive model during reference data acquisition obtained by inputting and calculating vibration data serving as reference into an autoregressive model constructed based on vibration data serving as reference and vibration data serving as reference, of a root mean square value calculated from a difference between predicted waveform data of vibration during diagnosis based on an autoregressive model during reference data acquisition obtained by inputting and calculating vibration data during diagnosis into the autoregressive model constructed based on vibration data serving as reference and vibration data during diagnosis;

in a plane in which a first axis and a second axis are orthogonal, a variable on the first axis being a first rate of change and a variable on the second axis being a second rate of change, arranging a plot of a diagnostic result based on a value of the first rate of change being calculated and a value of the second rate of change being calculated; and determining a state of a valve to be diagnosed based on a value of the first rate of change being calculated, a value of the second rate of change being calculated, and an arrangement position on the plane of a plot of the diagnostic result.

Using the diagnosis method and the diagnosis device according to the present invention allows the state change of the valve to be appropriately predicted and diagnosed with a simple configuration. Thus, furthermore, a manager or an operator of the valve can appropriately select and determine necessary measures to be performed before failure occurrence according to the state of the valve.

The valve opening and closing torque is increased by the valve stem sticking in the valve. This valve stem sticking, and eventually the rise of the valve opening and closing torque, that is, the malfunction of the valve, appears in the vibration change of the valve. Therefore, by measuring the vibration change of the valve, it is possible to notify the prediction to the outside before malfunction after starting to show a torque increase that can lead to malfunction. In addition, it is possible to diagnose the state change (such as sticking) of the valve in a non-destructive state with respect to the valve and its peripheral devices. In addition, there is no need to construct a structural analysis model for diagnosis in advance for individual valves. In addition, it is possible to monitor the valve all the time. Furthermore, the deterioration prediction of the valve can be performed based on the change tendency of a plurality of indexes.

DESCRIPTION OF EMBODIMENT

Hereinafter, preferred embodiments of the present invention will be described with reference to the drawings.

Background to the Present Invention

Several maintenance methods have been developed for various valves constituting various plants. Promising methods of the methods include "A method of performing necessary measures before occurrence of failure according to the condition (situation) of the valve".

In order to appropriately select and determine the "necessary measures to be performed before occurrence of failure according to the condition (situation) of the valve", developing a method for predicting the state of the valve (apparatus) is needed focusing on when valve failure occurs.

As described above, several methods for predicting the state of the valve (apparatus) before occurrence of failure have been proposed. However, any one of these methods has an unresolved problem. That is, a method for accurately predicting a future state of the valve (apparatus) before occurrence of failure is not sufficiently presented.

In view of the above circumstances, the present invention presents a device and a method for accurately predicting a future state of a valve (apparatus) before occurrence of failure.

First Embodiment (Configuration of Valve Diagnosis Device)

Figure 1:
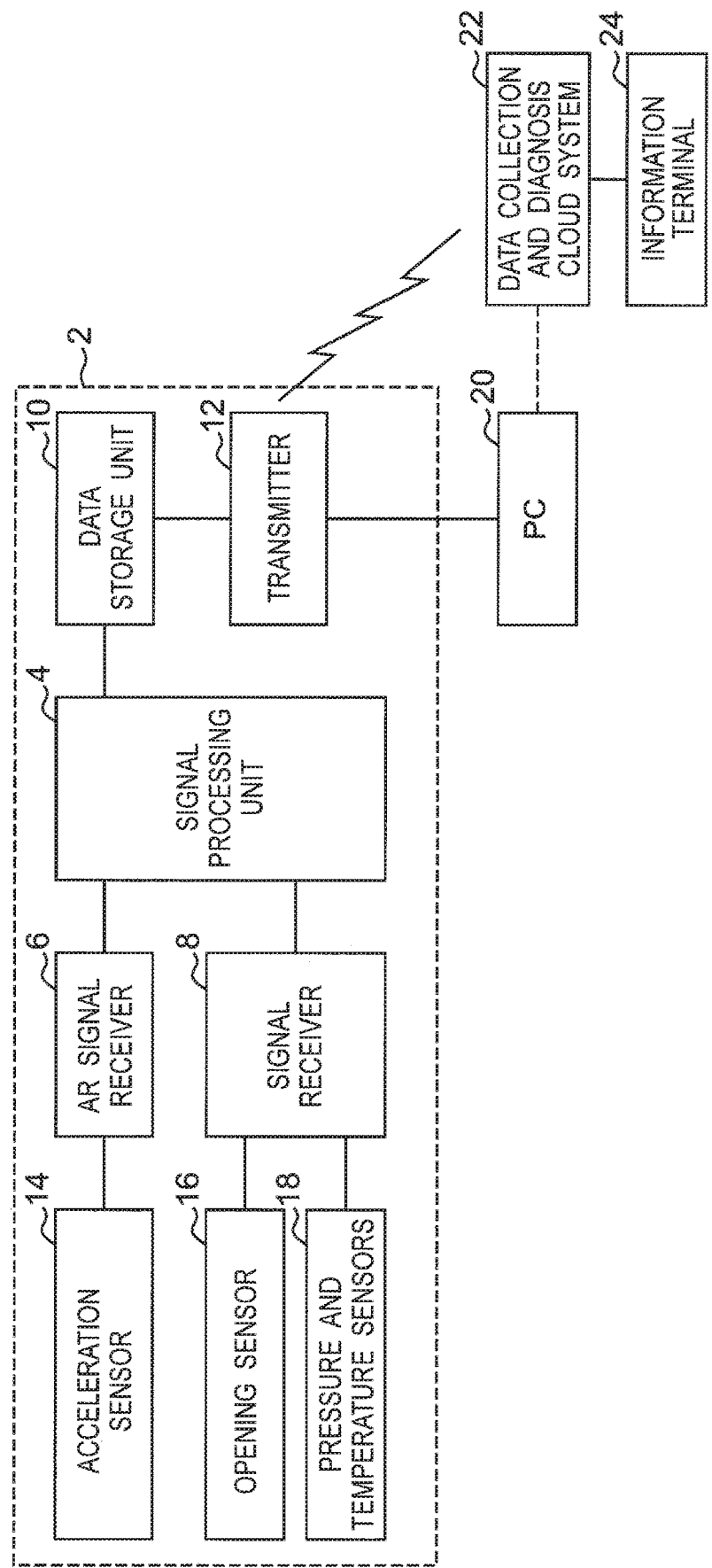
FIG. 1 is a schematic overall configuration diagram of a valve diagnosis device and a data collection and diagnosis cloud system according to a first embodiment of the present invention.

FIG. 1 is a schematic overall configuration diagram of a valve diagnosis device 2 and a data collection and diagnosis cloud system 22 according to a first embodiment of the present invention. First, the valve diagnosis device 2 shown in FIG. 1 includes a signal processing unit 4, an AR (autoregressive model) signal receiver 6, a signal receiver 8, a data storage unit 10, a transmitter 12, an acceleration sensor 14, an opening sensor 16, and pressure and temperature sensors 18. Among these, the acceleration sensor 14, the opening sensor 16, and the pressure and temperature sensors 18 are arranged in or attached to the valve to be measured itself or in the vicinity thereof.

It should be noted that in the following, the autoregressive model is "Auto regressive model", also described as an AR model.

The AR signal receiver 6 receives a vibration signal for constructing an autoregressive model from the acceleration sensor 14, as described in detail below. The signal receiver 8 receives a signal for determining the opening and closing state of the valve from the opening sensor 16 and the pressure and temperature sensors 18 (as described below). Based on the data from the AR signal receiver 6 and the data from the signal receiver 8, the signal processing unit 4 accurately predicts the future state of the valve, for example, schematically shown in FIGS. 2, 4, and 5. The data storage unit 10 stores data and the like output from the signal processing unit 4.

The transmitter 12 transmits data output from the signal processing unit 4 and data stored in the data storage unit 10 to the outside. For example, the transmitter 12 transmits data to the data collection and diagnosis cloud system 22 (external as seen from the valve diagnostic device 2). The transmitter 12 may communicate with the data collection and diagnosis cloud system 22 via personal computers (PC) 20 connected to the valve diagnosis device 2 by wire (and furthermore, for example, via the Internet communication network), or via various wireless communications (and furthermore, for example, via the Internet communication network). The data collection and diagnosis cloud system 22 can be operated from the information terminal 24, for example.

Figure 2:
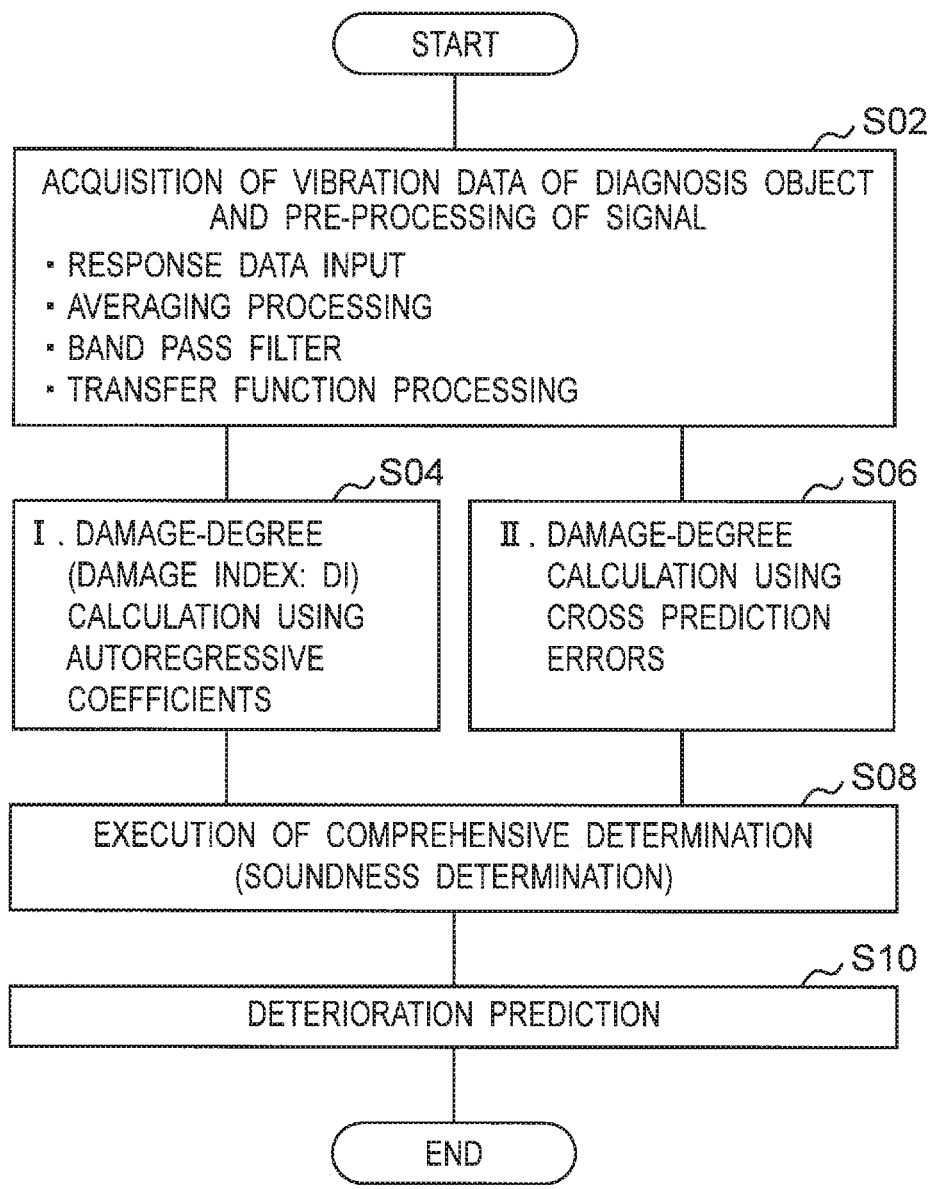
FIG. 2 is a diagram showing a flow of processing of determining and predicting a state of a valve in a valve diagnosis device according to the first embodiment of the present invention.
Figure 4:
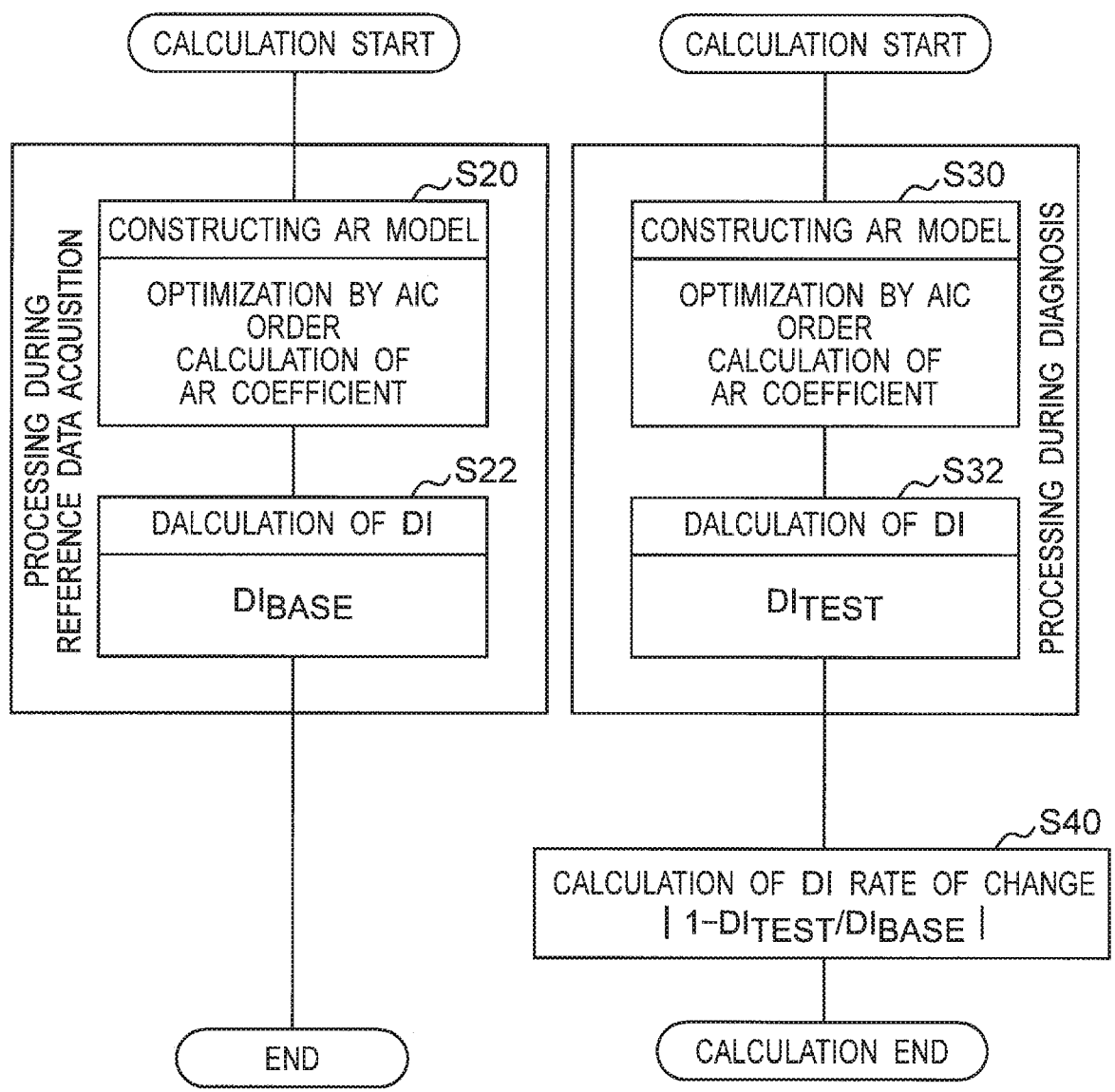
FIG. 4 is a diagram showing a flow of processing steps for calculating a damage-degree using a damage index (DI) based on autoregressive coefficients, and shows details of step S04 of the processing flow shown in FIG. 2.
Figure 5:
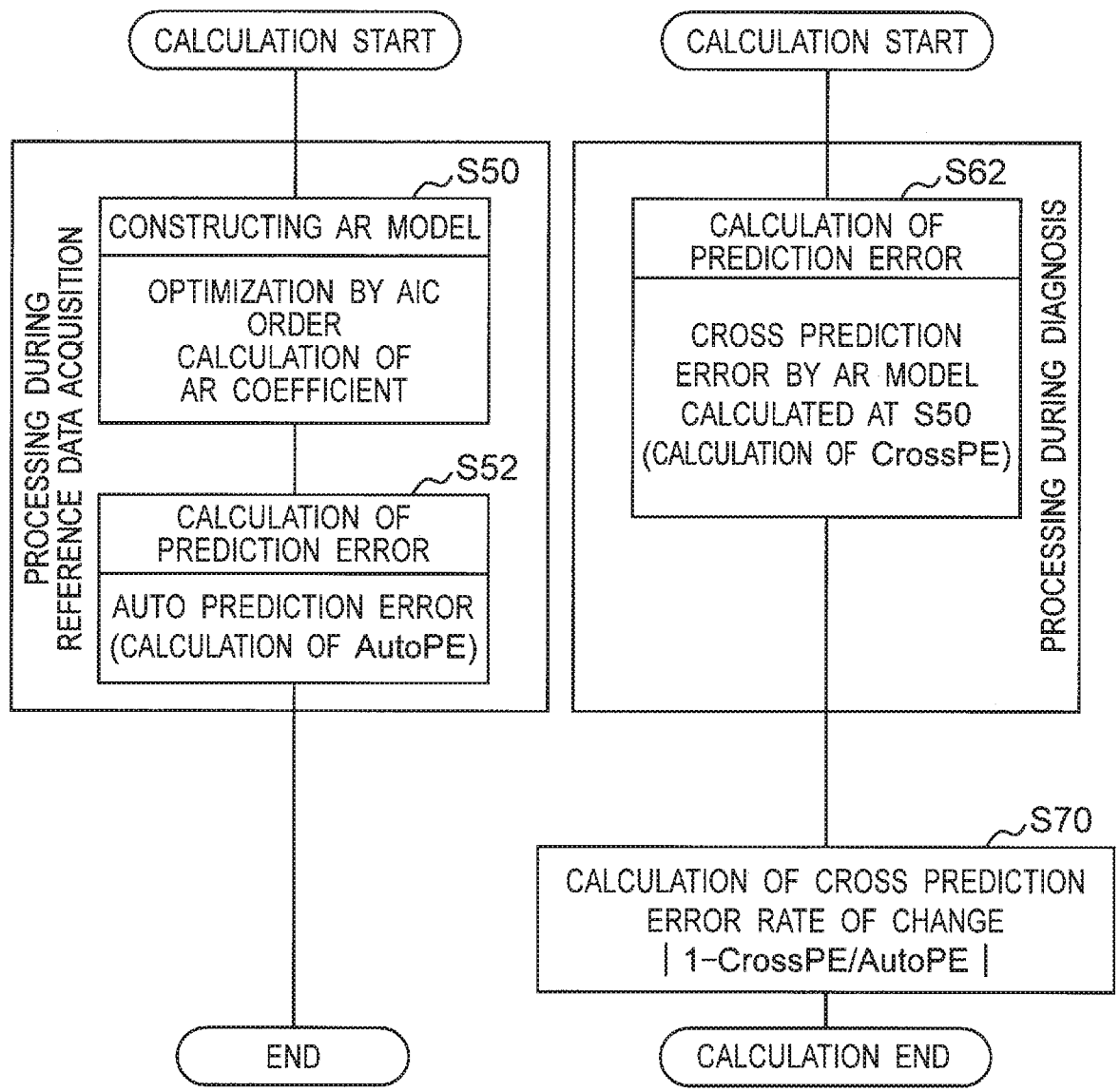
FIG. 5 is a diagram showing a flow of processing steps for calculating a damage-degree using cross prediction errors, and shows details of step S06 of the processing flow shown in FIG. 2.

It should be noted that processing related to data analysis, determination, and prediction in the flowcharts shown in FIGS. 2, 4, and 5 may be performed in the signal processing unit 4 of the valve diagnosis device 2, or may be performed in the data collection and diagnosis cloud system 22. In addition, the processing may be performed by a separate computer processor. For example, the processing may be performed by a personal computer (PC) 20 connected to the valve diagnosis device 2 by wire or a personal computer arranged in the vicinity of the valve diagnosis device 2.

(Operation of Valve Diagnosis Device)

FIG. 2 is a diagram showing a flow of processing of determining and predicting a state of a valve in a valve diagnosis device 2 according to the first embodiment of the present invention. In the flow shown in FIG. 2, processing is performed in the order of data measurement, analysis, diagnosis (determination), and prediction. It should be noted that the processing of the flow shown in FIG. 2 is periodically performed. For example, the processing may be performed on an hourly basis or on a daily basis.

Thus, in order to periodically perform the processing of determining and predicting the state of the valve shown in FIG. 2, the valve diagnosis device 2 includes a clock.

In addition, the valve has structural forms different between the open state and the closed state and different responses to external vibration. Therefore, unless the opening-closing state of the valve during soundness (of the valve) serving as the criterion is the same as the opening-closing state of the valve during diagnosis, accurate diagnosis (determination) cannot be performed. Therefore, the opening-closing state of the valve is measured as follows.

As shown in FIG. 1, an opening sensor 16 and pressure and temperature sensors 18 are provided in the valve (or in the vicinity of the valve). With these sensors, the signal processing unit 4 of the valve diagnosis device 2 or the data collection and diagnosis cloud system 22 measures the opening-closing state of the valve. When these sensors determine by measurement that the opening-closing state during diagnosis differs from the opening-closing state during soundness (of the valve) being the criterion, the opening of the valve is adjusted to the opening during soundness being the criterion by the control system of the plant or the operator of the valve. Thus, the accuracy of determination and prediction of the processing of determining and predicting the state of the valve shown in FIG. 2 is improved.

After the valve opening is adjusted to the valve opening during soundness being the criterion, the step (processing) in and after step S02 shown in FIG. 2 is performed. It should be noted that a limit switch, a potentiometer, an energy sensor to a drive unit (of a motor or the like), or the like may be used to measure the opening-closing state of the valve.

The measurement of the opening-closing state of the valve and the adjustment of the opening as described above are performed before the step of "acquisition of vibration data of the diagnosis object" (step S02). In addition, the valve is desirably returned to the original opening-closing state after the processing of determining and predicting the state of the valve shown in FIG. 2 is completed.

(Acquisition of Vibration Data of Diagnosis Object and Pre-Processing of Signal (Step S02))

In the flow of processing of determining and predicting the state of the valve shown in FIG. 2, first, a step of "acquisition of vibration data of a diagnosis object" (step S02) is executed. In detail, in this "acquisition of vibration data of a diagnosis object" (step S02), Response data input, Averaging processing, Application of band pass filter, Transfer function processing, and the like are performed.

Response Data Input

The signal processing unit 4 receives a vibration signal of the valve via the AR signal receiver 6 from the acceleration sensor 14 of the valve diagnosis device 2 shown in FIG. 1. In order to diagnose the valve state, the signal processing unit 4 acquires the measurement data of the constant vibration (including the vibration propagating from the surrounding environment) occurring in the valve.

Pre-Processing of Signal (Averaging Processing 1)

For example, the measurement is performed for 5 seconds. In other words, the measurement for 5 seconds is performed 5 times, each result is Fourier transformed, and the average of the five transformed results is calculated in the frequency domain. An inverse Fourier transform of the calculated transform result is set as vibration data for diagnosis.

Pre-Processing of Signal (Averaging Processing 2)

In addition, the measurement data may be acquired as follows. Measure sufficiently long data (for example, 30 seconds), divide the data into a plurality of sections, and perform Fourier transform on each section of the data. Calculate the average of the Fourier transform results. An inverse Fourier transform of the calculated transform result is set as vibration data for diagnosis.

Pre-Processing of Signal (Bandpass Filter)

It is preferable to remove noise from the vibration data for diagnosis obtained by measurement. Therefore, a Fourier transform is performed on the vibration data for diagnosis, and a bandpass filter is applied to the result. With this bandpass filter, frequency bands that do not affect the diagnosis and contain a lot of noise are removed. The result of removal is subjected to inverse Fourier transformation to restore the vibration data.

For example, the vibration noise of vehicles that pass nearby and the like is often included in the region not more than 200 Hz. Therefore, regardless of whether or not such vibration noise is actually included, signals in the region of not more than 200 Hz are often removed. In addition, since the characteristic vibration as a valve is rarely included in the region of not less than 10000 Hz in many cases, signals in the region of not less than 10000 Hz are often removed.

Transfer Function Processing

Figure 3:
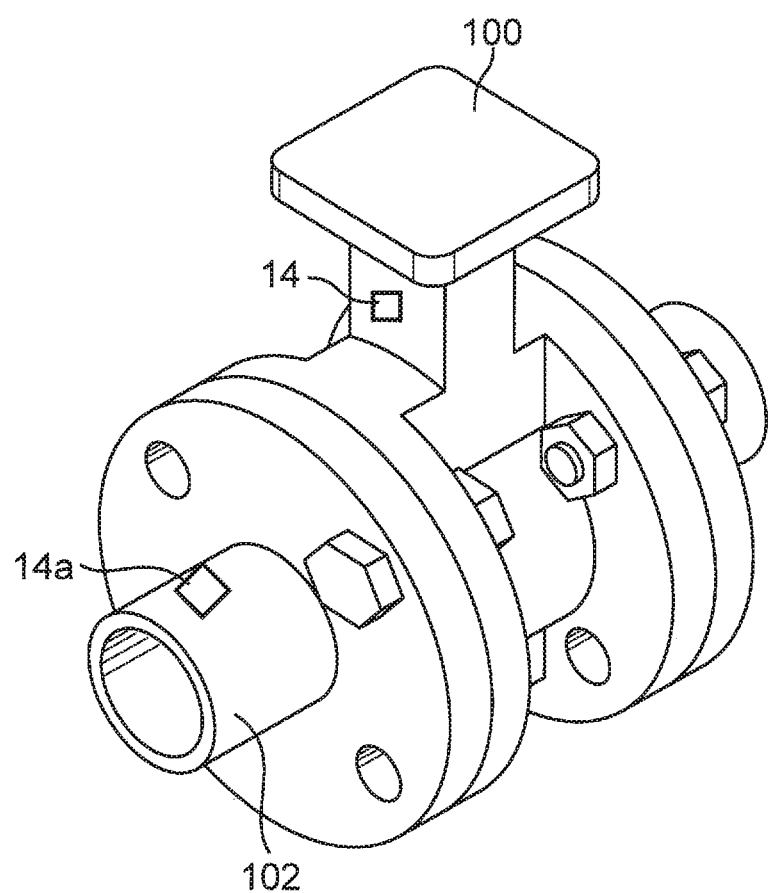
FIG. 3 is a perspective view of a valve to which two acceleration sensors are attached.

Even if noise components from the surrounding environment are removed, the intensity of vibration components transmitted to the valve to be diagnosed and the frequency components included in the vibration components are not necessarily constant each time. It is necessary to correct these effects. For this correction, as shown in FIG. 3, in addition to the acceleration sensor 14 for measuring the vibration of the valve 100 itself, a second acceleration sensor 14a is attached in the vicinity of the valve 100 to be diagnosed (in FIG. 3, on the outer surface of the pipe 102). The free vibration of the valve 100 is extracted by using the measurement value with the second acceleration sensor 14a. The "free vibration" herein is the vibration inherent to a certain system and is vibration data of the valve itself. That is, it can be said to be a characteristic including the natural vibration and attenuation constant of the valve.

Specifically, in order to offset changes in environmental vibration, assuming that the values of the acceleration sensor 14 for measuring vibration of the valve 100 are X1, Y1, and Z1, and the values of the second acceleration sensor 14a are X2, Y2, and Z2, values of X1/X2, Y1/Y2, and Z1/Z2 being transfer functions are used as vibration data for soundness diagnosis (determination).

(Damage-Degree Calculation (Step S04, Step S06))

In the flow of processing of determining and predicting the state of the valve shown in FIG. 2, subsequently, the steps of "damage-degree (Damage Index: DI) calculation using autoregressive coefficients" (step S04) and "damage-degree calculation using cross prediction errors" (step S06) are executed.

In the flow shown in FIG. 2, step S04 and step S06 are executed in parallel, but step S06 may be executed after step S04 and before step S08 (described below), or step S04 may be executed after step S06 and before step S08.

FIG. 4 is a diagram showing a flow of processing steps for calculating damage-degree (Damage Index: DI) using autoregressive coefficients, and shows details of step S04 of the processing flow shown in FIG. 2. Similarly, FIG. 5 is a diagram showing a flow of processing steps for calculating damage-degree using cross prediction errors, and shows details of step S06 of the processing flow shown in FIG. 2.

First, in the flowchart shown in FIG. 4, as shown in the drawing, the processing flow is divided into two flows during reference data acquisition and during diagnosis (other than during reference data acquisition). That is, in the flowchart shown in FIG. 4, the flow on the left side is executed in the processing during reference data acquisition, and the flow on the right side is executed in the processing during diagnosis. Here, the reference data, that is, the vibration data serving as reference is acquired when the state of the valve is sound at the initial stage of use of the valve. Therefore, the time of reference data acquisition indicates one point at the initial stage of use of the valve.

It should be noted that since normally, the processing during reference data acquisition is performed to acquire and determine an autoregressive model during reference data acquisition (described below), a damage index ($DI_{BASE}$) during reference data acquisition, and an auto prediction error (AutoPE), the processing only has to be performed at least once.

The processing flow is divided into two flows during reference data acquisition and during diagnosis (other than during reference data acquisition), a flow on the left side is executed in the processing during reference data acquisition, and a flow on the right side is executed in the processing during diagnosis. The same is true also in the flowchart of the processing steps of the damage-degree calculation using the cross prediction errors shown in FIG. 5.

In the flowchart shown in FIG. 4, during reference data acquisition, first, an AR model (autoregressive model) based on vibration data serving as reference is constructed (step S20). The construction of the well-known AR model (autoregressive model) is represented by the following equation.

$$[Y_j] = \sum_{i=1}^{k} (a_i Y_{j-i}) + e_j \qquad \text{[Math 1]}$$

where, k is "order". That is, in order to construct an autoregressive model, it is necessary to determine the order "k" of the autoregressive coefficient. Therefore, in the present invention, a well-known Akaike's Information Criterion (AIC) method is used. An autoregressive model is constructed based on the order calculated by AIC.

For example, the order is determined as follows. The measurement data (vibration data) and a numeral of "order" candidates are input into the calculation function of AIC included in well-known numerical calculation software to be calculated, whereby the calculation function of AIC outputs a numerical value. Such operation is repeated sequentially while changing the numeral of "order" candidates, and when among the finite "order" candidates the numerical value output by the calculation function of AIC is the smallest, the numeral among the "order" candidates is set as the order in constructing the AR model. The range of numerals among the finite "order" candidates is designated, for example, from 20 to 400, and the like.

Furthermore, the measurement data (vibration data) and the order obtained by the calculation function of AIC described above are input into a well-known autoregressive model calculation function, and an autoregressive model is constructed.

In the flowchart shown in FIG. 4, during reference data acquisition, subsequently the damage index is calculated from the autoregressive coefficients based on the vibration data serving as reference (step S22). The damage index is defined as follows.

$$DI = \frac{a_1}{\sqrt{a_1^2 + a_2^2 + \ldots + a_n^2}} \qquad \text{[Math 2]}$$

where, n is a natural number whose value is appropriately determined.

The autoregressive coefficient of the autoregressive model constructed based on the measurement data (vibration data) includes information as a valve structure. As described above, the damage index is defined as an index for checking the condition of change in the autoregressive coefficient, that is, the condition of damage of the valve.

The calculated DI (damage index) is stored in the data storage unit 10 as the damage index "$DI_{BASE}$" during reference data acquisition. It should be noted that step S40 is not performed in the processing during reference data acquisition.

Furthermore, in the flowchart shown in FIG. 4, during diagnosis, an AR model (autoregressive model) based on vibration data during diagnosis is constructed (step S30). Although there is a difference whether the procedure for constructing the AR model (autoregressive model) is based on the vibration data during diagnosis or based on the vibration data serving as reference during reference data acquisition, the procedure itself for constructing the AR model (autoregressive model) is the same as the procedure for constructing the AR model (autoregressive model) during reference data acquisition (step S20).

Furthermore, in the flowchart shown in FIG. 4, during diagnosis, subsequently the damage index is calculated from the autoregressive coefficients based on the vibration data during diagnosis (step S32). Although there is a difference whether the calculation of the damage index is based on the autoregressive coefficients based on the vibration data during diagnosis or based on the autoregressive coefficients based on the vibration data serving as reference during reference data acquisition, the calculation itself of the damage index is the same as the calculation of the damage index during reference data acquisition (step S22).

Furthermore, in the flowchart shown in FIG. 4, during diagnosis, the rate of change of the damage index (DI) is calculated (step S40). The rate of change of the damage index (DI) is defined as follows.

$$|1-DI_{TEST}/DI_{BASE}| \quad \text{[Math 3]}$$

where, "$DI_{BASE}$" is a damage index during reference data acquisition (stored in the data storage unit 10), and "$DI_{TEST}$" is a damage index during diagnosis.

The autoregressive coefficient constructed based on the vibration data expresses the vibration characteristic of the valve as a structure. The vibration characteristic means information such as natural frequency and attenuation constants. Therefore, when sticking or the like occurs in the valve, a change occurs in the structure, and a difference occurs in the autoregressive coefficient as compared with the reference time (during reference data acquisition). Therefore, it is possible to detect the state change of the valve by using and comparing coefficients including these characteristics. The rate of change to be detected (difference) is calculated as the rate of change of the damage index (DI).

Subsequently, also in the flowchart shown in FIG. 5, as described above, the processing flow is divided into two flows during reference data acquisition and during diagnosis (other than during reference data acquisition).

In the flowchart shown in FIG. 5, during reference data acquisition, first, an AR model (autoregressive model) based on vibration data serving as reference is constructed (step S50). The procedure for constructing the AR model (autoregressive model) herein is the same as the procedure for constructing the AR model (autoregressive model) in step S20 of the flowchart shown in FIG. 4.

In the flowchart shown in FIG. 5, during reference data acquisition, subsequently the vibration data serving as reference (waveform data) is input into the autoregressive model constructed based on the vibration data serving as reference, and predicted waveform data of vibration based on the autoregressive model during reference data acquisition is calculated. Moreover, a root mean square of the difference between the vibration data serving as reference (waveform data) and the predicted waveform data of vibration based on the autoregressive model during reference data acquisition is calculated (step S52). The root mean square herein is referred to as "auto prediction error (AutoPE (Prediction Error)".

Even when the vibration data serving as reference during reference data acquisition is input into the autoregressive model constructed based on the vibration data during reference data acquisition, since the autoregressive model is an approximate expression, the predicted waveform data contains an error. The AutoPE is a numerical representation of the error.

The calculated AutoPE (auto prediction error) is stored in the data storage unit 10. It should be noted that step S70 is not performed in the processing during reference data acquisition.

Furthermore, during diagnosis, in the flowchart shown in FIG. 5, there is no possibility of constructing an autoregressive model based on the vibration data during diagnosis. During diagnosis, vibration data (waveform data) during diagnosis is input into the autoregressive model constructed in step S50 based on the vibration data serving as reference, and the predicted waveform data of the vibration during diagnosis is calculated based on the autoregressive model during reference data acquisition. Moreover, a root mean square of the difference between the vibration data during diagnosis (waveform data) and the predicted waveform data of vibration during diagnosis based on the autoregressive model during reference data acquisition is calculated (step S62). The root mean square herein is referred to as cross prediction error (CrossPE (Prediction Error)).

Since the autoregressive model includes information as a structure (valve), when the state of the structure (valve) is changed during diagnosis, inputting vibration data during diagnosis into the autoregressive model during reference data acquisition makes the error (CrossPE) larger than the error during reference data acquisition. In the flowchart shown in FIG. 5, during diagnosis, subsequently the rate of change of the cross prediction error is calculated (step S70). The rate of change of the cross prediction error is defined as follows.

$$|1-CrossPE/AutoPE| \quad \text{[Math 4]}$$

(Execution of Comprehensive Determination (Soundness Determination) (Step S08))

In the flow of processing of determining and predicting the state of the valve shown in FIG. 2, subsequently, the step of "execution of comprehensive determination (soundness determination)" (step S08) is executed.

It should be noted that in the processing during reference data acquisition, the following "execution of comprehensive determination (soundness determination)" (step S08) and "deterioration prediction" (step S10) are not executed. This is because the processing during reference data acquisition has an object of constructing the autoregressive model during reference data acquisition and acquiring and deciding the damage index ($DI_{BASE}$) and the auto prediction error (AutoPE) during reference data acquisition.

Figure 6:
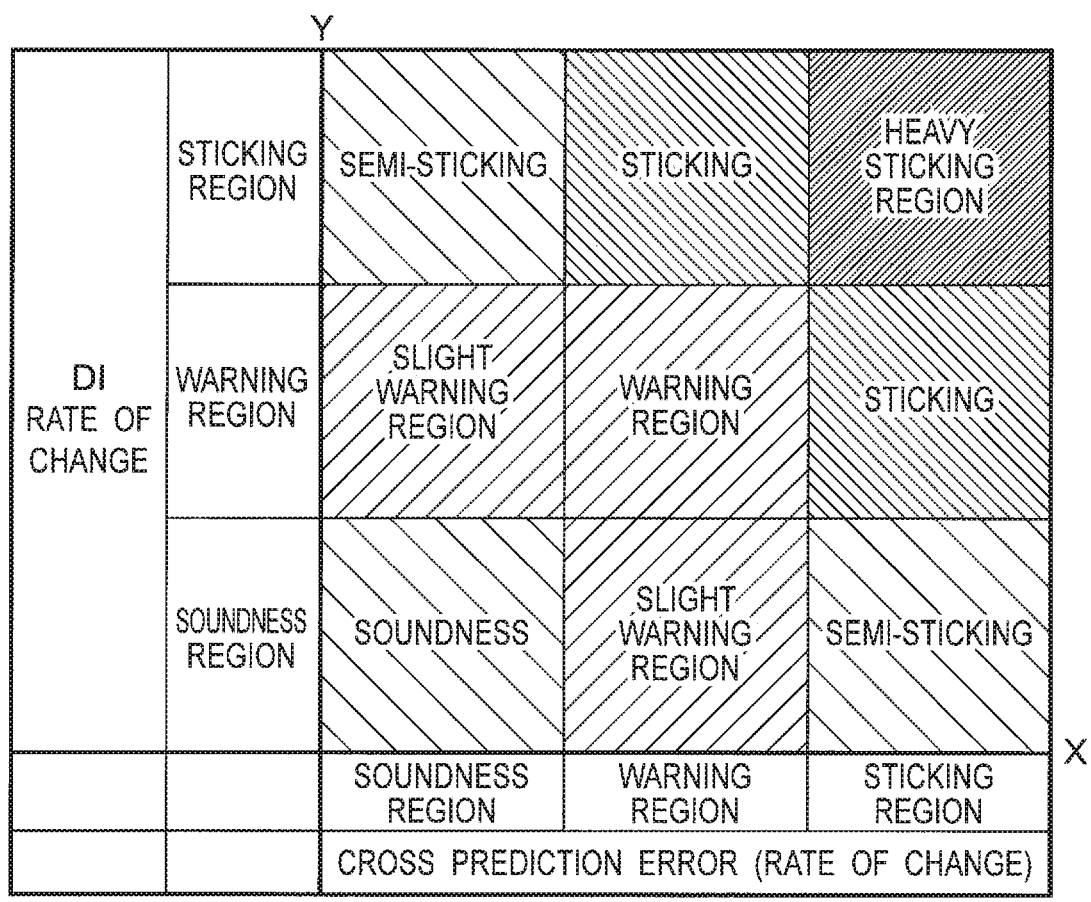
FIG. 6 is a diagram showing an example of a state diagnosis map.

The rate of change of the damage index (DI) and the rate of change of the cross prediction error are plotted on a state diagnosis map as shown in FIG. 6. In the state diagnosis map, the Y-axis represents the DI rate of change and the X-axis represents the cross prediction error rate of change. As shown in FIG. 6, the state diagnosis map is divided into nine regions, and a concrete threshold value is assigned to each of the boundaries of the regions (see FIGS. 7 and 9).

Figure 7:
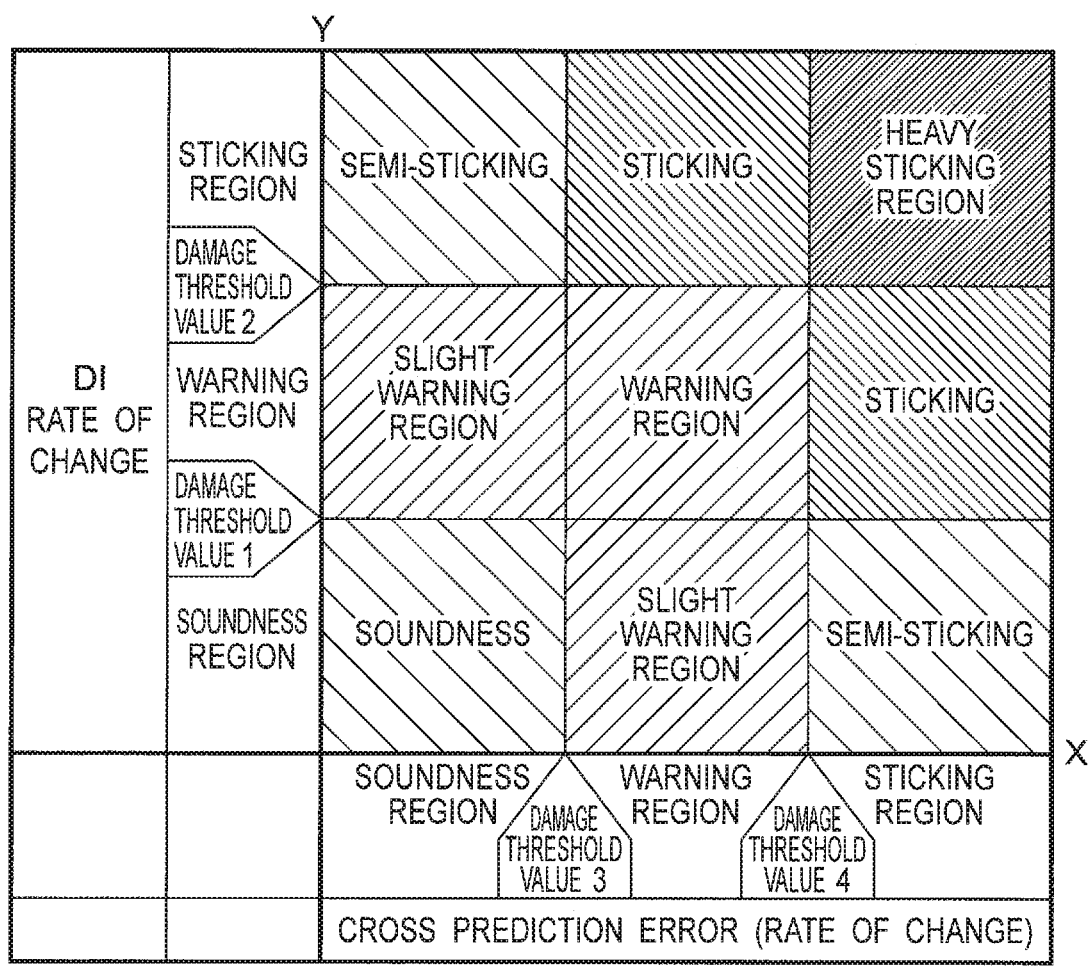
FIG. 7 is a diagram showing an example of a state diagnosis map.

That is, as shown in FIG. 7, the DI rate of change on the Y-axis is divided into "soundness region", "warning region", and "sticking region", the "soundness region" and "warning region" of the DI rate of change are classified by damage threshold value 1, and the "warning region" and the "sticking region" of the DI rate of change are classified by the damage threshold value 2. Similarly, as shown in FIG. 7, the cross prediction error rate of change on the X-axis is divided into "soundness region", "warning region", and "sticking region", the "soundness region" and "warning region" of the cross prediction error rate of change are classified by damage threshold value 3, and the "warning region" and the "sticking region" of the cross prediction error rate of change are classified by the damage threshold value 4. Determination of concrete values for damage threshold values 1 to 4 will be described below.

Furthermore, as shown in FIG. 6, the nine regions of the state diagnosis map are classified as a "soundness region", (two) "slight warning regions", a "warning region", (two) "semi-sticking regions", (two) "sticking regions", and a "heavy sticking region" in accordance with the region of the DI rate of change on the Y-axis and the region of the cross prediction error rate of change on the X-axis.

In the state diagnosis map shown in FIG. 6, when any one of the indexes comes out from the soundness region, sticking may be occurring, so the state is determined to be in "slight warning". When both indexes are in warning regions, the state is determined to be in "warning". When one index is in the soundness region and the other index is in the sticking region, the state is determined to be in "semi-sticking". When one index is in the warning region and the other index is in the sticking region, the state is determined to be in "sticking". When both indexes are in the sticking regions, the state is determined to be in "heavy sticking".

In the state diagnosis map configured as described above, it is determined whether the state of the valve is in "soundness", "slight warning", "warning", "semi-sticking", "sticking", or "heavy sticking" depending on the region in which the rate of change of the damage index (DI) and the rate of change of the cross prediction error are plotted.

It should be noted that the division of the DI rate of change on the Y-axis and the division of the cross prediction error rate of change on the X-axis are not limited to those described above. Each of the rates of change may be divided into more (or less). Therefore, the division of the region of the state diagnosis map is not limited to the above division either. The state diagnosis map may be divided into more (or less) regions.

The damage threshold values 1 to 4 in the state diagnosis map can be determined by various calculation methods. In the following, an example of a calculation method for experimentally determining the damage threshold values and an example of a calculation method for statistically determining the damage threshold values will be described.
(Example of Calculation Method for Experimentally Determining Damage Threshold Values)

When the valve is a butterfly having a rubber seat ring, in this valve, during the state where the opening and closing torque is 10 N·m, the value of the DI rate of change to be acquired is set as "damage threshold value 1", and the value of the cross prediction error rate of change to be acquired is set as "damage threshold value 3". The reason for adopting the value during the state where the opening and closing torque of the valve is 10 N·m is because 10 N·m is a nearly minimum limit value at which human beings can detect sticking. In an actual experiment, the "damage threshold value 1" was 0.25 and the "damage threshold value 3" was 0.33.

Furthermore, in this valve, during the state where the opening and closing torque is 50 N·m, the value of the DI rate of change to be acquired is set as "damage threshold value 2", and the value of the cross prediction error rate of change to be acquired is set as "damage threshold value 4". The reason for adopting the value during the state where the opening and closing torque of the valve is 50 N·m is because 50 N·m is a value at which resistance due to valve sticking is apparently felt when opening and closing is performed by human power. In an actual experiment, the "damage threshold value 2" was 0.35 and the "damage threshold value 4" was 0.65.
(Example of Calculation Method for Statistically Determining Damage Threshold Values)

In the calculation method for experimentally determining the damage threshold values, since it is necessary to perform experiments for each kind of valves and to determine threshold values individually, sometimes the calculation method is not realistic. Thus, in order to set the damage threshold values automatically, a plurality of times of measurement are performed during reference data acquisition, a standard deviation (a) is obtained based on a plurality of DI rates of change values and cross prediction error rates of change values, values obtained by adding 1σ to the average values of the rates of change are set as the damage threshold value 1 and the damage threshold value 3, and values obtained by adding 2a to the average values of the rates of change are set as the damage threshold value 2 and the damage threshold value 4.
[Determination Formulae]

Damage Threshold Value 1 and Damage Threshold Value 3=Average Value+Standard Deviation Damage Threshold Value 2 and Damage Threshold Value 4=Average Value+2×Standard Deviation Table 1 below shows an example of the damage threshold value determination. W0-1 to W0-30 represent a plurality of measurement results during reference data acquisition. That is, in the actual operation state in which the valve is used, the standard deviation is obtained by 30 times of measurement during reference data acquisition, and the damage threshold value is calculated.

TABLE 1

|  | W0-1 | W0-2 | ... | W0-30 | average value | standard deviation | 1σ | 2σ |
|---|---|---|---|---|---|---|---|---|
| DI rate of change | 0.166 | 0.066 | ... | 0.066 | 0.146 | 0.075 | 0.075 | 0.150 |
| cross prediction error rate of change | 0.331 | 0.431 | ... | 0.231 | 0.338 | 0.108 | 0.108 | 0.216 |

From the above Table 1,
damage threshold value 1=0.221,
damage threshold value 3=0.446,
damage threshold value 2=0.296, and
damage threshold value 4=0.553.
(Deterioration Prediction (Step S10))

In the flow of processing of determining and predicting the state of the valve shown in FIG. 2, subsequently, the step of "Deterioration Prediction" (step S10) is executed.

Continuing the measurement as described above accumulates the value of the DI rate of change and the value of the cross prediction error rate of change representing the state of the valve. In step S10, the transition timing between each region of the state diagnosis map is predicted by using the trend of these values.

Figure 8A:
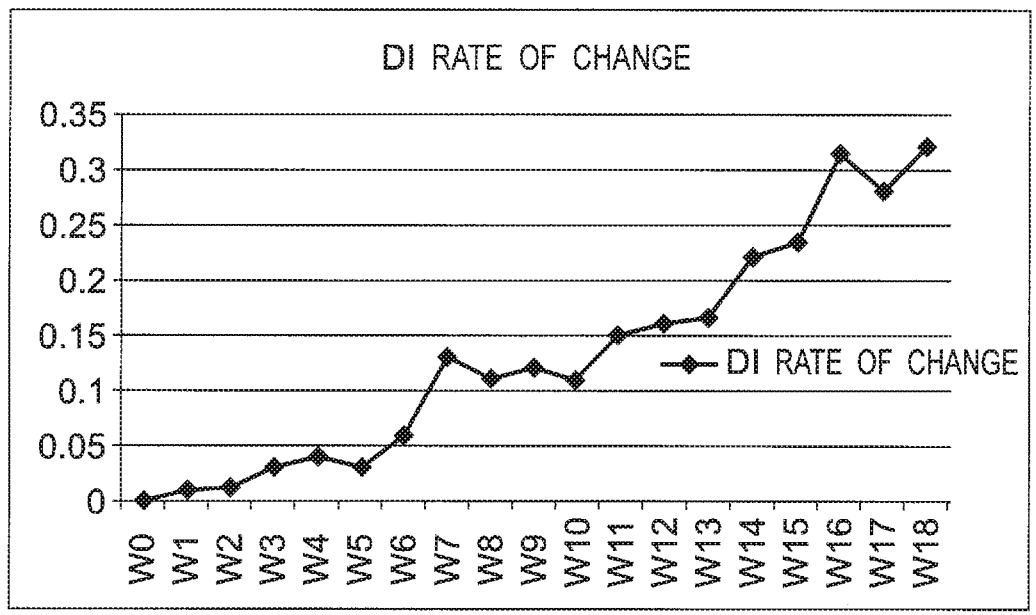
FIG. 8A is a graph showing a transition example of the value of a DI rate of change from the 0th week (W0), the 1st week (W1) to the 18th week (W18).
Figure 8B:
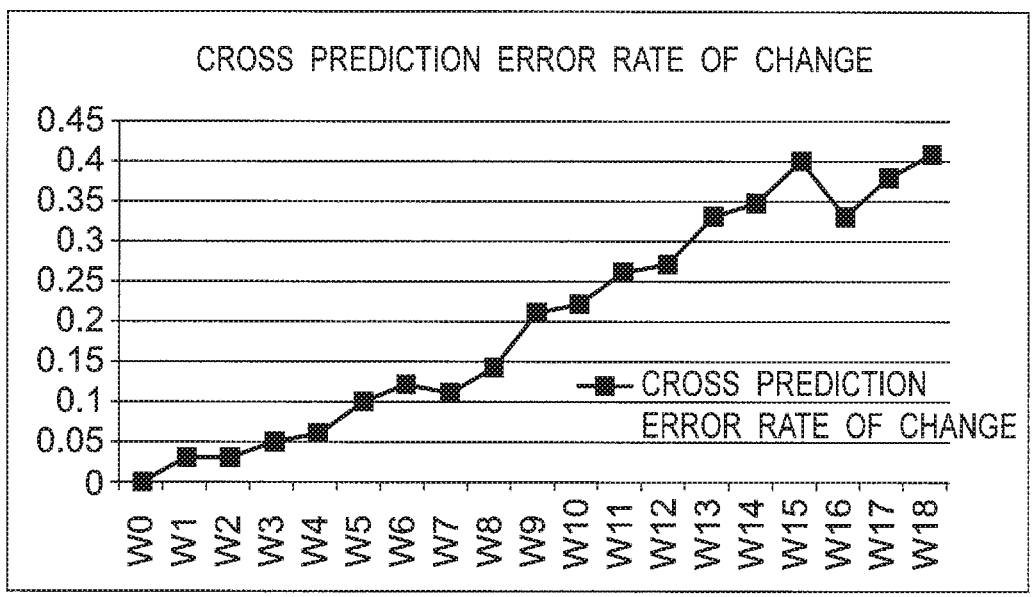
FIG. 8B is a graph showing a transition example of the value of a cross prediction error rate of change from the 0th week (W0), the 1st week (W1) to the 18th week (W18).

That is, approximate expressions are constructed with respect to the value of the DI rate of change and the value of the cross prediction error rate of change periodically measured and calculated. FIG. 8A is a graph showing a transition example of the value of the DI rate of change from the 0th week (W0), the 1st week (W1) to the 18th week (W18), and FIG. 8B is a graph showing a transition example of the value of the cross prediction error rate of change from the 0th week (W0), the 1st week (W1) to the 18th week (W18). For the transition (example) in these FIG. 8A and FIG. 8B, approximate expressions are obtained. Here, as an approximate expression, a linear approximation, an exponential approximation, a polynomial approximation, a moving average, and the like are prepared in advance, measurement results (DI rate of change and cross prediction error rate of change) are input into these approximate expressions to calculate respective correlation coefficients $R^2$ between the approximate expression and the actual measurement value, and finally, approximate expressions with the highest fit rates (that is, the maximum numerical values of the correlation coefficients) are adopted. From the approximate expression constructed in this manner, it is possible to predict the time when the DI rate of change and the cross prediction error rate of change are shifted to "soundness region"→"warning region" →"sticking region".

Figure 9:
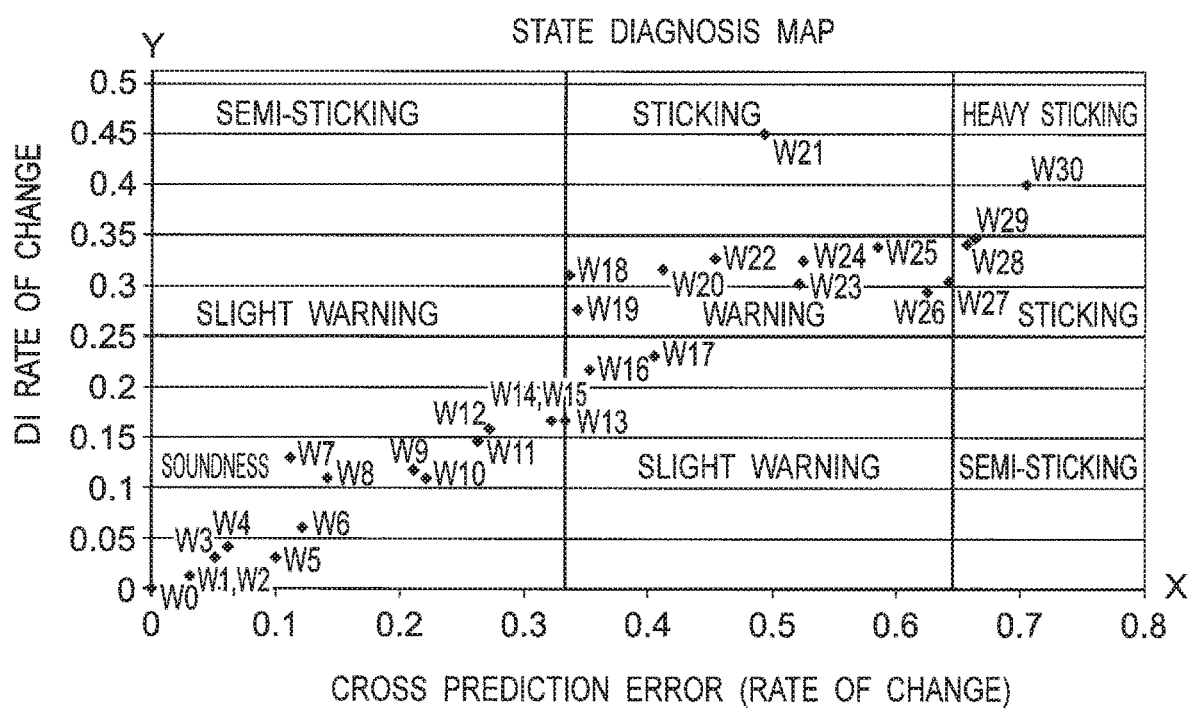
FIG. 9 is a diagram showing an example of a state diagnosis map.

FIG. 9 is a state diagnosis map in which examples of periodic diagnostic results for a valve are plotted. In FIG. 9, the diagnostic results from the 0th week (W0), the 1st week (W1) to the 30th week (W30) are plotted. In this case, an approximate expression that best represents the transition of the DI rate of change and an approximate expression that best represents the transition of the cross prediction error rate of change are obtained, and from these two approximate expressions, it is possible to predict the value of the DI rate of change, the value of the cross prediction error rate of change, and the plot position of the state diagnosis map in, the future (that is, in and after the 31st week).

Thus, by grasping the timing when the state of the valve may change, the users of the valve diagnosis device 2 and the data collection and diagnosis cloud system 22 can take concrete measures such as performing maintenance and the like before the state change and adding the valve to the list of the valves on which maintenance should be performed at the timing of the periodic inspection.

(Summary)

The valve diagnosis device according to the first embodiment includes an AR signal receiver 6 for receiving a vibration signal from the acceleration sensor 14 to output vibration data, and a signal processing unit 4. The signal processing unit 4 executes the steps of:

(a) calculating a value of a first rate of change, with respect to a predetermined damage index during reference data acquisition calculated based on an autoregressive model constructed based on vibration data serving as reference, of the predetermined damage index during diagnosis calculated based on an autoregressive model constructed based on vibration data during diagnosis;

(b) calculating a value of a second rate of change, with respect to a root mean square value calculated from a difference between predicted waveform data of vibration based on an autoregressive model during reference data acquisition obtained by inputting and calculating vibration data serving as reference into an autoregressive model constructed based on vibration data serving as reference and vibration data serving as reference, of a root mean square value calculated from a difference between predicted waveform data of vibration during diagnosis based on an autoregressive model during reference data acquisition obtained by inputting and calculating vibration data during diagnosis into the autoregressive model constructed based on vibration data serving as reference and vibration data during diagnosis;

(c) in a plane in which a first axis and a second axis are orthogonal, a variable on the first axis being a first rate of change and a variable on the second axis being a second rate of change, arranging a plot of a diagnostic result based on a value of the first rate of change being calculated and a value of the second rate of change being calculated; and (d) determining a state of a valve to be diagnosed based on a value of the first rate of change being calculated, a value of the second rate of change being calculated, and an arrangement position on the plane of a plot of the diagnostic result.

Using the diagnosis device according to the first embodiment allows the state change of the valve to be appropriately predicted and diagnosed with a simple configuration. Thus, furthermore, a manager or an operator of the valve can appropriately select and determine necessary measures to be performed before failure occurrence according to the state of the valve.

OTHER EMBODIMENTS

The present invention is not limited to the above-described first embodiment. For example, in the state diagnosis map, three or more damage threshold values may be set on each of the X-axis and the Y-axis, or only one damage threshold value may be set.

In addition, for example, the valve diagnosis device may obtain an approximate expression based on a plurality of plots in the state diagnosis map to predict the state of the valve.

In addition, the present invention can be used not only for valves but also for maintenance of plants, maintenance of factories, and condition diagnosis of apparatuses.

REFERENCE SIGNS LIST 2 valve diagnosis device
4 signal processing unit
14 acceleration sensor
22 data collection and diagnosis cloud system
100 valve

The invention claimed is:

1. A valve diagnosis method comprising the steps of:
calculating a value of a first rate of change, with respect to a predetermined damage index during reference data acquisition calculated based on an autoregressive model constructed based on vibration data serving as reference, of the predetermined damage index during diagnosis calculated based on an autoregressive model constructed based on vibration data during diagnosis;
calculating a value of a second rate of change, with respect to a root mean square value calculated from a difference between predicted waveform data of vibration based on an autoregressive model during reference data acquisition obtained by inputting and calculating vibration data serving as reference into an autoregressive model constructed based on vibration data serving as reference and vibration data serving as reference, of a root mean square value calculated from a difference between predicted waveform data of vibration during diagnosis based on an autoregressive model during reference data acquisition obtained by inputting and calculating vibration data during diagnosis into the autoregressive model constructed based on vibration data serving as reference and vibration data during diagnosis;
in a plane in which a first axis and a second axis are orthogonal, a variable on the first axis being a first rate of change and a variable on the second axis being a second rate of change, arranging a plot of a diagnostic result based on a value of the first rate of change being calculated and a value of the second rate of change being calculated;
determining a state of a valve to be diagnosed based on a value of the first rate of change being calculated, a value of the second rate of change being calculated, and an arrangement position on the plane of a plot of the diagnostic result; and
outputting a notification of the determined state of the valve.

2. The valve diagnosis method according to claim 1, wherein the determining step includes determining a state of a valve to be diagnosed based on a value of the first rate of change being calculated, a value of the second rate of change being calculated, and an arrangement position of a plot of the diagnostic result based on at least one first threshold value relating to a first rate of change and at least one second threshold value relating to a second rate of change.

3. The valve diagnosis method according to claim 2, wherein the first threshold value and the second threshold value are determined based on data obtained by an experiment on a valve.

4. The valve diagnosis method according to claim 2, wherein the first threshold value and the second threshold value are determined based on data obtained by statistically processing a plurality of pieces of vibration data relating to a valve.

5. The valve diagnosis method according to claim 1, further comprising the steps of:
   constructing a first approximate expression indicating transition of a first rate of change based on a plurality of first rate of change values,
   constructing a second approximate expression indicating transition of a second rate of change based on a plurality of second rate of change values, and
   predicting a state of a valve to be diagnosed based on a first predicted value calculated from the first approximate expression, a second predicted value calculated from the second approximate expression, and an arrangement position of a predicted plot on the plane based on the first predicted value and the second predicted value.

6. A valve diagnosis device comprising:
   a signal receiver configured to receive a vibration signal including vibration data; and
   a signal processing unit configured to execute the steps of:
      calculating a value of a first rate of change, with respect to a predetermined damage index during reference data acquisition calculated based on an autoregressive model constructed based on vibration data serving as reference, of the predetermined damage index during diagnosis calculated based on an autoregressive model constructed based on vibration data during diagnosis;
      calculating a value of a second rate of change, with respect to a root mean square value calculated from a difference between predicted waveform data of vibration based on an autoregressive model during reference data acquisition obtained by inputting and calculating vibration data serving as reference into an autoregressive model constructed based on vibration data serving as reference and vibration data serving as reference, of a root mean square value calculated from a difference between predicted waveform data of vibration during diagnosis based on an autoregressive model during reference data acquisition obtained by inputting and calculating vibration data during diagnosis into the autoregressive model constructed based on vibration data serving as reference and vibration data during diagnosis;
      in a plane in which a first axis and a second axis are orthogonal, a variable on the first axis being a first rate of change and a variable on the second axis being a second rate of change, arranging a plot of a diagnostic result based on a value of the first rate of change being calculated and a value of the second rate of change being calculated;
      determining a state of a valve to be diagnosed based on a value of the first rate of change being calculated, a value of the second rate of change being calculated, and an arrangement position on the plane of a plot of the diagnostic result; and
      outputting a notification of the determined state of the valve.

* * * * *